(12) United States Patent
Rippe

(10) Patent No.: US 12,696,184 B2
(45) Date of Patent: Jul. 28, 2026

(54) AUTOMATIC ACCESS TO ON-BOARD COMMUNICATION NETWORKS

(71) Applicant: GOGO BUSINESS AVIATION LLC, Broomfield, CO (US)

(72) Inventor: Christopher M. Rippe, Arvada, CO (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 395 days.

(21) Appl. No.: 18/218,499

(22) Filed: Jul. 5, 2023

(65) Prior Publication Data

US 2025/0016667 A1 Jan. 9, 2025

(51) Int. Cl.
*H04L 1/00* (2006.01)
*H04W 4/40* (2018.01)
(Continued)

(52) U.S. Cl.
CPC .............. *H04W 48/18* (2013.01); *H04W 4/40* (2018.02); *H04W 12/06* (2013.01); *H04W 60/00* (2013.01)

(58) Field of Classification Search
CPC ....... H04W 48/18; H04W 4/40; H04W 12/06; H04W 60/00; H04W 84/005;
(Continued)

(56) References Cited

U.S. PATENT DOCUMENTS

| | | | |
|---|---|---|---|
| 7,113,780 B2 | 9/2006 | McKenna et al. | |
| 7,187,927 B1 | 3/2007 | Mitchell | |

(Continued)

FOREIGN PATENT DOCUMENTS

| | | |
|---|---|---|
| CN | 105491644 B | 1/2019 |
| CN | 110635837 A | 12/2019 |

(Continued)

OTHER PUBLICATIONS

International Application No. PCT/US2024/034952, International Search Report and Written Opinion, mailed Sep. 26, 2024.

*Primary Examiner* — Tanmay K Shah

(74) *Attorney, Agent, or Firm* — Holland & Hart LLP

(57) ABSTRACT

Systems and methods are provided for configuring a user device to access a communicating network is provided. A user device may execute an application configured to support voice communications when the user device is located within a plurality of vehicles. The user device may determine, via the application, that the user device is in a vehicle of the plurality of vehicles. The use device may obtain, via the application and from a computing system associated with the vehicle, a list of communication networks that support voice bearers available based upon a current state of the vehicle. The user device may select, via the application, a preferred communication network from the list of communication networks based on one or more predetermined characteristics of the communication networks. The user device may configure, via the application, the user device with credentials to access the preferred communication network. The user device may transmit, to the computing system associated with the vehicle, a registration message that includes the credentials for the preferred communication network.

20 Claims, 13 Drawing Sheets

(51) Int. Cl.
*H04W 12/06* (2021.01)
*H04W 48/18* (2009.01)
*H04W 60/00* (2009.01)

(58) Field of Classification Search
CPC ... H04W 12/069; H04W 76/15; H04W 84/06;
H04L 67/12
USPC ........................................................ 455/411
See application file for complete search history.

(56) References Cited

U.S. PATENT DOCUMENTS

| | | | |
|---|---|---|---|
| 7,366,116 B2 | 4/2008 | Wynn | |
| 7,675,904 B2 | 3/2010 | Chou et al. | |
| 7,920,860 B2 | 4/2011 | Chari et al. | |
| 8,223,951 B1 | 7/2012 | Edelhaus et al. | |
| 8,601,155 B2 | 12/2013 | Toombs et al. | |
| 9,137,143 B2 | 9/2015 | Parker et al. | |
| 9,197,314 B1 | 11/2015 | Lauer et al. | |
| 9,392,499 B2 | 7/2016 | Sylvain | |
| 9,621,850 B1 | 4/2017 | Mitchell | |
| 9,998,937 B2 | 6/2018 | Sugahara et al. | |
| 10,097,503 B2 | 10/2018 | Bergman | |
| 10,321,517 B2 | 6/2019 | Shi | |
| 10,686,675 B2 | 6/2020 | Cordray et al. | |
| 2015/0133117 A1* | 5/2015 | Lauer | H04W 76/10 455/435.1 |
| 2017/0201627 A1 | 7/2017 | Fukuda et al. | |
| 2021/0227029 A1 | 7/2021 | Harter | |
| 2022/0232465 A1 | 7/2022 | Tsuda | |

FOREIGN PATENT DOCUMENTS

| | | |
|---|---|---|
| CN | 114710194 A | 7/2022 |
| EP | 2023685 A1 | 2/2009 |
| EP | 3046273 B1 | 7/2019 |
| EP | 3557781 A1 | 10/2019 |
| EP | 3214873 B1 | 7/2020 |
| JP | 4488201 B2 | 6/2010 |
| WO | WO-2009082378 A2 | 7/2009 |

* cited by examiner

400A

400C

Manage Profiles

*Predefined*

Communication Network 1     ❯    414

Communication Network 2     ❯    416

⋮

Communication Network N     ❯    418

*Custom*

Generic Profile     ❯    420

400D

New Profile

Profile Name                                        422

Domain                                              424

Extension                                           426

Password                                            428

430

Done

FIG. 4D

AUTOMATIC ACCESS TO ON-BOARD COMMUNICATION NETWORKS

TECHNICAL FIELD

The instant disclosure generally relates to configuring computing devices. More particularly, the instant disclosure generally relates to configuring a computing device to access a preferred communication network.

BACKGROUND

When a user is in a certain type of vehicle (e.g., aircraft, boats, etc.), traditional cellular networks may be unavailable. However, the user may wish to have a voice call with another user outside of the vehicle. Conventionally, the user may be required to manually configure a user device to access a communication network in a vehicle. Such a manual configuration process requires the user to have knowledge of which network equipment the vehicle operator installed in the vehicle. This information is not conventionally available to many users. Therefore, there is a need for techniques to configure a user device to access a preferred communication network automatically.

BRIEF SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method for configuring the user device to access a communicating network is provided. The method is implemented by a user device and comprises (1) executing, via one or more processors, an application configured to support voice communications when the user device is located within a plurality of vehicles; (2) determining, via the application, that the user device is in a vehicle of the plurality of vehicles; (3) obtaining, via the application and from a computing system associated with the vehicle, a list of communication networks that support voice bearers available based upon a current state of the vehicle; (4) selecting, via the application, a preferred communication network from the list of communication networks based on one or more predetermined characteristics of the communication networks; (5) configuring, via the application, the user device with credentials to access the preferred communication network; and (6) transmitting, to the computing system associated with the vehicle, a registration message that includes the credentials for the preferred communication network.

In another embodiment, a user device configured to access a communicating network is provided. The user device comprises (i) one or more processors; and (ii) a non-transitory memory storing executable instructions thereon. The instructions, when executed by the one or more processors, cause the one or more processors to (1) execute an application configured to support voice communications when the user device is located within a plurality of vehicles; (2) determine, via the application, that the user device is in a vehicle of the plurality of vehicles; (3) obtain, via the application and from a computing system associated with the vehicle, a list of communication networks that support voice bearers available based upon a current state of the vehicle; (4) select, via the application, a preferred communication network from the list of communication networks based on one or more predetermined characteristics of the communication networks; (5) configure, via the application, the user device with credentials to access the preferred communication network; and (6) transmit, to the computing system associated with the vehicle, a registration message that includes the credentials for the preferred communication network.

In another embodiment, a computer readable storage medium for configuring a user device to a communications network is provided. The computer readable storage medium stores non-transitory computer readable instructions that, when executed on one or more processors of a user device, cause the one or more processors to (1) execute an application configured to support voice communications when the user device is located within a plurality of vehicles; (2) determine, via the application, that the user device is in a vehicle of the plurality of vehicles; (3) obtain, via the application and from a computing system associated with the vehicle, a list of communication networks that support voice bearers available based upon a current state of the vehicle; (4) select, via the application, a preferred communication network from the list of communication networks based on one or more predetermined characteristics of the communication networks; (5) configure, via the application, the user device with credentials to access the preferred communication network; and (6) transmit, to the computing system associated with the vehicle, a registration message that includes the credentials for the preferred communication network.

BRIEF DESCRIPTION OF THE DRAWINGS

The figures described below depict various aspects of the applications, methods, and systems disclosed herein. It should be understood that each figure depicts one embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIGS. 4A-4D are exemplary interfaces displayed on an electronic device, such as one of the user devices 110 of FIG. 1, associated with the implementation of the method for configuring a user device to access a communication network disclosed herein;

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Figure 1:
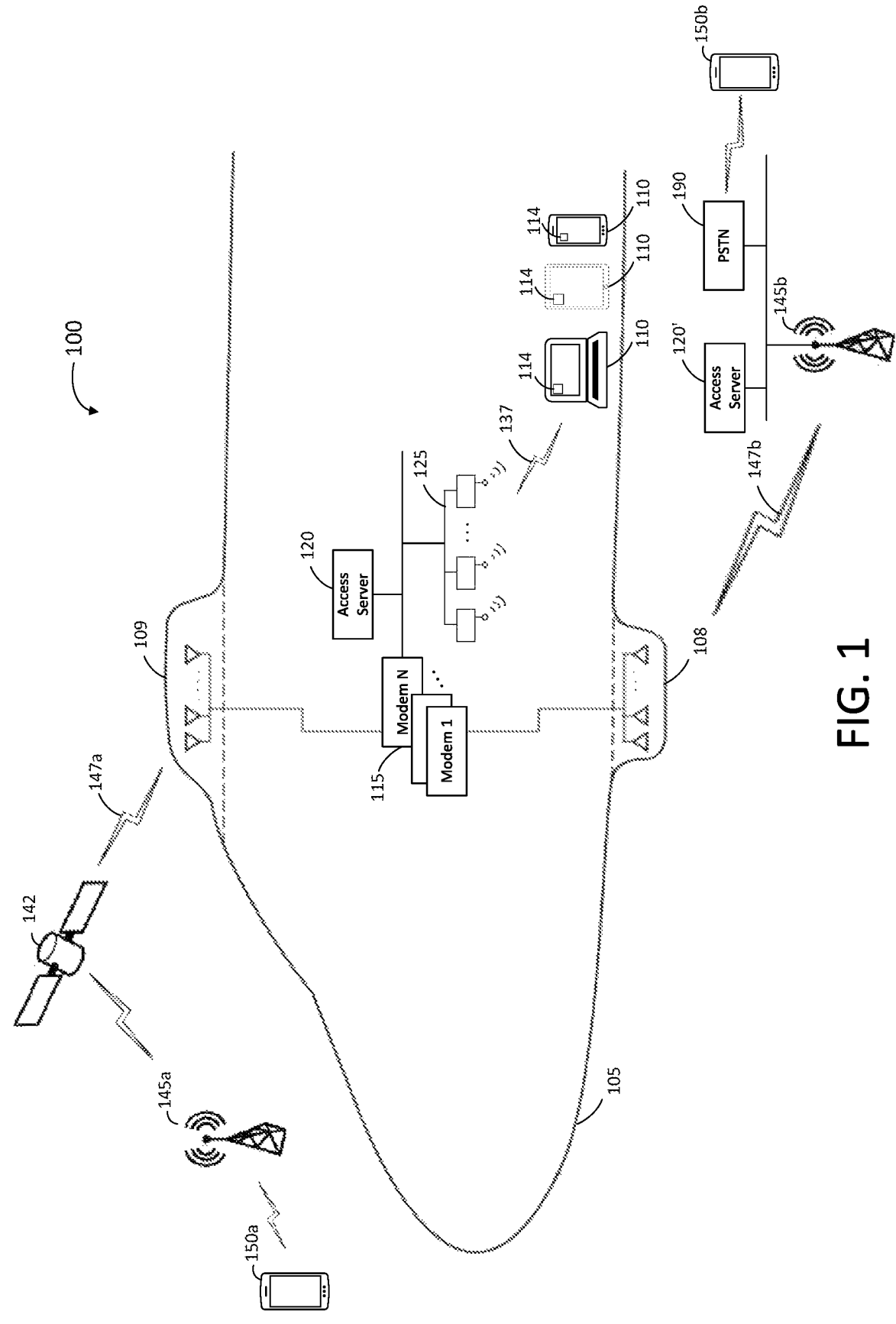
FIG. 1 illustrates an exemplary communication system capable of performing the method for configuring a user device to access a communication network disclosed herein.

FIG. 1 depicts an embodiment of an exemplary communication system 100 in which a method for configuring a user device to access a communication network may be performed. The communication system 100 may include components located in a vehicle 105. The vehicle 105 may be associated with at least two communication links: an on-board communication link 137 to provide communication services to user devices 110 while the user devices 110 are in the vehicle 105, and a communication link 147 between the vehicle 105 and a terrestrial base station 145.

As illustrated, the external communication link 147 may couple the vehicle 105 to any number of different communication networks. In the illustrated example, the external communication link 147*a* couples the vehicle 105 to a satellite communication network and the external communication link 147*b* couples the vehicle 105 to an air-to-ground (ATG) network. For the illustrated satellite communication network, the external communication link 147*a* may connect the vehicle 105 to a satellite 142 that relays data to and from a terrestrial base station 145*a*. On the other hand, for the illustrated ATG communication network, the external communication link 147*b* may couple the vehicle 105 directly to a terrestrial base station 145*b*. In some embodiments, multiple communication links 147 may be associated with the vehicle 105, e.g., the vehicle 105 may be communicatively connected to one or more ATG communication links 147*b* and one or more satellite-based communication links 147*a*. As illustrated, the base stations 145 are coupled to a public switched telephone network (PSTN) 190 via which terrestrial user devices 150 are accessible.

As illustrated, the vehicle 105 may include one or more modems 115 configured to be compatible with a plurality of different communication standards utilized by the on-board communication link 137 and the communication link 147. For example, the on-board communication link 137 and the communication link 147 may utilize communication protocols associated with terrestrial communications (e.g., TDMA, GSM, CDMA, GSM, LTE, WiMAX, Wi-Fi, etc.) and/or associated with frequencies in the $K_a$ band, the $K_u$ band, the L band, 5 GHz band, 2.4 GHz band, and/or any other suitable wireless communication frequency bands. Each of the plurality of modems 115 may be connected to at least one respective antenna 108, 109 and/or on-board wireless access point 125 configured to receive/transmit signals utilizing any supported communication protocol. It should be appreciated that although certain communication protocols are more suitable for use in one of the on-board communication link 137 or the communication link 147, this does not preclude the additional or alternative use of the communication protocol for the less suitable communication link.

As illustrated, the user device 110 may install an application 114. The user devices 110 may include any mobile computing device, such as a smartphone, a tablet, a laptop computer, a personal digital assistant, an e-reader, smart glasses, smart watches, or any other mobile computing device capable of wireless communications. When the application 114 is executed on the user device 110, the user device may, via the application 114, determine whether it is within a vehicle 105, self-configure to access a communication network available within the vehicle, initiate and receive a voice call with a user device 150 external to the vehicle 105 via the communication network. To this end, the user devices 110 may, via the application 114, transmit and receive data over the on-board communication link 137 via the on-board wireless access points 125. The plurality of modems 115 may determine that some of the data transmitted by the electronic devices 110 is addressed to a user device 150 external to the vehicle 105. Accordingly, the plurality of modems 115 may forward and/or transmit this data to a terrestrial base station 145 via a communication link 147 for routing to the user device 150.

The communication system 100 may also include an access server 120 to control access to the on-board communication link 137 and/or the external communication links 147. The access server 120 may interpret a set of non-transitory, computer-readable instructions to perform a process for allowing the user device 110 to access a communication network described herein. As one example, the application 114 executed on the user device 110 may be configured to cause the user device 110 to periodically transmit a poll message to detect that the user device 110 is on-board a vehicle. When the user device 110 is coupled to the on-board communication link 137, the access server 120 detects the poll message and initiates a registration process for the user device 110. As part of the registration process, the access server 120 may generate, transmit, and/or update a list of available communication networks based upon a current state of the vehicle 105 as described below.

In some embodiments, the access server 120 may receive a registration message from the user device 120 directed to a preferred communication network. The access server 120 may identify a modem (e.g., one of the modems 115) corresponding to the preferred communication network and transmit the registration message to that modem. The modem may communicate with an entity of the preferred communication network (e.g., an authentication entity) to register the user device 110 with the preferred communication network. Upon receiving a response from the entity, the modem may transmit the response to the access server 120. The access server 120 may then transmit the response to the user device 110.

In some embodiments, the access server 120 may pass messages from the user device 110 to an entity of the preferred communication network (e.g., an authentication entity), and vice versa. In one embodiment, the user device 110 generates and transmits a registration message to register with the preferred communication network. In response, the access server 120 may accept or reject the registration message based upon account credentials in the registration message. Upon accepting the registration message, the access server 120 may complete the registration process for the user device 110 with the preferred communication network. As a result, the access server 120 may pass data received from the user device 110 to a user device 150 outside the vehicle 105 via the preferred communication network, and vice versa. It should be appreciated that the access server 120 does not need to perform all the functions described above, and some or all functions may be performed in another component in a computing system of the vehicle 105. According to certain aspects, the access server 120 may be fixedly attached to the vehicle 105 (e.g., the access server 120) or disposed interconnected to the terrestrial base station 145 (e.g., the access server 120'). Although FIG. 1 depicts the access servers 120 and 120', as described above, and other access entities are additionally or alternatively envisioned.

Figure 2:
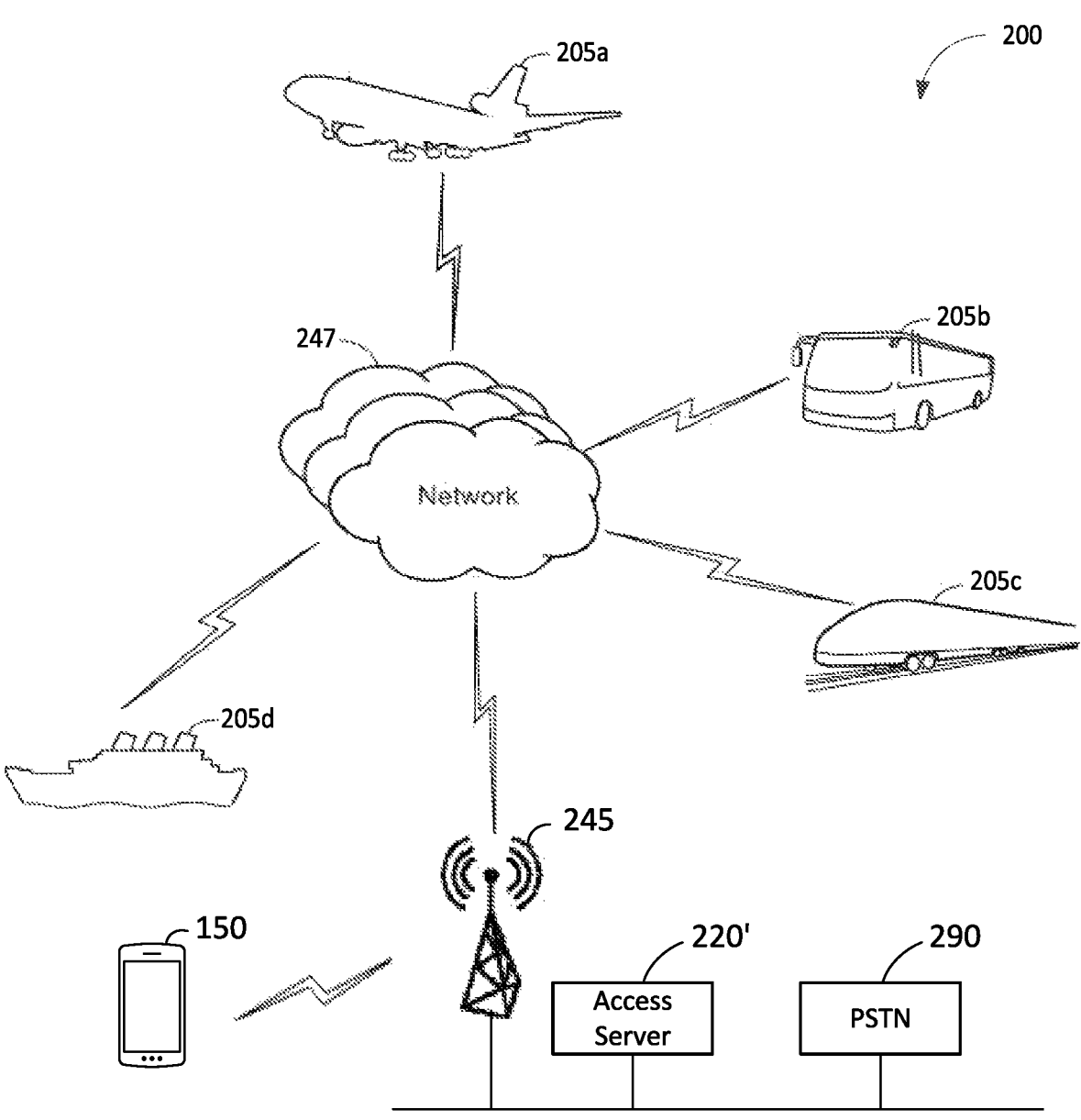
FIG. 2 illustrates an exemplary system including a plurality of different vehicle types in which the method for configuring a user device to access a communication network disclosed herein may be implemented.

Turning to FIG. 2, depicted is an exemplary communication system 200 including a plurality of different vehicle types containing respective on-board wireless networks capable of performing the method for configuring a user device to access a communication network disclosed herein. In particular, the communication system 200 includes an airplane 205a (such as the vehicle 105), a bus 205b, a train 205c, and a boat 205d each equipped with respective on-board wireless networks. Beyond the vehicles 205a-d, it should be appreciated additional and/or alternative vehicles are envisioned (e.g., a car, a helicopter, a submarine, convention center, mall, etc.).

Each of the vehicles 205a-d may be in communication with a terrestrial base station 245 (such as any of the terrestrial base stations 145) via an air-to-ground network 247 (such as any of the communication links 147). The terrestrial base station 245 may be interconnected with a PSTN 290 (such as the PSTN 190). In some embodiments, the terrestrial base station 245 may be located on a nautical platform or other physical structure disposed in a body of water. In the communication system 200, the access server 220' may control access to the respective on-board wireless networks associated with each of the vehicles 205a-d. In this sense, the access server 220' may centralize the regulation of the respective on-board wireless networks associated with each of the vehicles 205a-d. Alternatively, it is also envisioned that any number of the vehicles 205a-d contain their own access server for localized management of their respective on-board wireless networks.

While FIG. 2 depicts each of the vehicles 205a-d in communication with the terrestrial base station 245, it is envisioned that each of the vehicles 205a-d may be in communication with any number of terrestrial base stations associated with any number of communication networks. To this end, the communication system 200 may contain a plurality of terrestrial base stations disposed across a geographic region enabling the vehicles 205a-d to maintain a communication link over one or more different communication networks throughout the course of a journey.

Turning to FIGS. 3A-3D, illustrated are example signal diagrams 300A-300D in which a user device 310 may perform a method for configuring a user device to access a communication network disclosed herein. Although FIGS. 3A-3D depict the access server 320, as described above, other access entities are additionally or alternatively envisioned. The functionalities described with reference to the signal diagrams 300A-300D may be implemented, for example, in the communication systems 100, 200.

The signal diagram 300A may begin when a user of a user device 310 carries (301) a user device 310 onto a vehicle (such as the vehicles 105 or 205a-d). The user device 310 may be installed with an application disclosed herein. When the application is executed by the user device 310, the user device 310 may broadcast a polling message. In one embodiment, the user device 310 may broadcast the polling message periodically while executing the application. In another embodiment, the user device 310 may broadcast the polling message upon detecting a stimulus from the user to search for on-board communication networks. The access server 320 or the other component, upon receiving the polling message, may transmit a response to the user device 310. The response may indicate to the application executing on the user device 310, that the user device 310 is within a vehicle.

Upon determining that the user device is within a vehicle, the user device 310 may transmit (303), via the application, a request to the access server 320 to request a list of communication networks available on the vehicle. The user device 310 may communicate with the access server 320 using any standard communication protocol supported by both the user device 310 and the computing system of the vehicle. In one embodiment, upon receiving the request, the access server 320 may generate (305) a list of available communication networks. The access server 320 may then transmit (307) a response to the user device 310 that includes the list. In some embodiments, the access server 320 may generate (305) the list of communication networks in response to other stimuli. For example, the access server 320 may periodically generate the list of available communication networks (e.g., every 30 seconds, every minute, every two minutes) and/or in response to detecting a change in the available communication networks. In these embodiments, the access server 320 may respond to the request for the list from the user device 310 by sending a response (307) that includes the most recently generated list of available communication networks.

As described herein, the access server 320 may generate the list of available communication networks based upon a current state of the vehicle. For example, a particular communication network may be available when the vehicle is above the ground (and, thus, in signal range of terrestrial base stations), but may be unavailable when the vehicle is above the sea. In another example, a particular network may have a high data rate in a first location, but may have a low data rate in a second location (e.g., due to interference or network congestion). Accordingly, the access server 320 may generate (305) a list of communication networks based upon a current location of the vehicle. In addition to the location, a state of the vehicle may further include a motion phase (e.g., aircraft flight phase), an elevation of the vehicle (e.g., above or below 10,000 feet), and/or other characteristics that impact the availability of one or more communication networks.

Upon receiving the list of communication networks, the application executing on the user device 310 may automatically select (309) a preferred communication network 340 from the list based upon one or more characteristics of the available communication networks. The characteristics may include a cost, a latency, and a data rate of a voice bearer supported by a respective communication network. In some embodiments, the communication networks may dedicate particular bearers (e.g., carrier frequencies) to voice traffic. In these embodiments, the voice bearers may be assigned a higher a Quality of Service (QOS) higher than other bearers used for general data communications. In one embodiment, the user device 310 may select (309) a communication network with a lowest latency, a lower cost, or a highest data rate as a preferred communication network 340. In another embodiment, the user device 310 may select (309) a preferred communication network 340 based upon a combination of more than one characteristic. In yet another embodiment, the user device 310 may select (309) a preferred communication network 340 based upon the characteristics and a policy associated with the user. In yet another embodiment, the user device 310 may select (309) a preferred communication network 340 based upon a user input or predefined preference. In some embodiments, the characteristics are static characteristics of the available networks. For example, a characteristic related to latency may not represent a measured latency of the communication network, but an amount of latency generally associated with the communication network. Accordingly, in these embodiments, the application may maintain a database of potential communication networks and their corresponding characteristics that are evaluated when selecting a preferred communication network. In other embodiments, the access server 320 may maintain a database of potential communication networks and their corresponding characteristics. When generating the list of communication networks, the access server 320 may add the characteristics of the communication networks to the list and transmit the list to the user device 320.

Upon selecting the preferred communication network, the application executing on the user device 310 may configure (311) the user device 310 (i.e., "self-configure") to access the preferred communication network 340. To this end, the application may maintain network profiles associated with the potential communication networks. The network profiles may include credentials for accessing the respective communication network. Accordingly, the application may use the network profile associated with the preferred communication network to perform self-configuration for accessing the preferred network 340. Alternatively, the application may present a graphical user interface that enables the user to manually generate and/or modify a network profile that includes the credentials for accessing the preferred communication network 340.

After the configuration process is completed, the user device 310 may transmit (313) a registration message to the access server 320. The registration message may include the credentials obtained during the configuration process. For example, the credential may be a particular identifier of the user device 310 (such as a MEID, a pESN, a UCCID, a MDN, a MIN, or any other identifier unique to the user device 310). In one embodiment, the access server 320 may authenticate the user device 310 based upon the credentials. If the user device 310 is authenticated, the access server 320 may assign an extension number to the user device. The access server 320 may then generate a request for registration including an identifier of the access server 320 and the extension number assigned to the user device 310. The access server 320 may then transmit the request to an authentication entity 344 of the preferred communication network 340 for authentication. In another embodiment, the access server 320 may generate and transmit (315) a request for registration to an authentication entity 344 of the preferred network 340 without locally authenticating the user device 310. The access server 320 may include the credentials received from the user device 310 into the request for registration for authentication and transmit the request to the authentication entity 344 of the preferred communication network 340 for authentication. In some embodiments, the authentication entity 344 is located outside of the vehicle (e.g., the authentication server 120'). In other embodiments, the authentication entity 344 is equipment that includes a modem for communicating over the preferred communication network located on-board the vehicle (e.g., equipment associated with one of the modems 115).

If the authentication entity 344 of the preferred communication network accepts the registration request, the authentication entity 344 may transmit (317) a response to the access server 320 indicating that the registration request is allowed and complete the registration process with the preferred communication network. In the scenario where the registration request includes an identifier of the access server 320 and an extension number of the user device 310, the authentication entity 344 may authenticate the registration request based upon the identifier and the extension number. Once the request is authenticated, other devices may communicate with the user device 310 using the identifier and extension number via the preferred communication network 340. Alternatively, the authentication entity 344 may assign a temporary phone number associated with the identifier such that other devices may communicate with the user device 310 using the temporary phone number via the preferred communication network 340. In the scenario where the registration request includes the credentials received from the user device 310, the authentication entity may authenticate the registration request based upon the credentials. Once the request is authenticated, the authentication entity 344 may assign a temporary phone number to the user device 310 such that other devices may communicate with the user device 310 using the temporary phone number via the preferred communication network 340. It should be appreciated that this temporary phone number may be a different number than the number otherwise associated with the user device 310 when communicating over a terrestrial cellular communication network. In these embodiments, the access server 320 may update a routing table to associate an address at which the user device 310 is assigned for communicating over the on-board communication network (e.g., via the communication link 137) and the phone number associated with the preferred communication network (e.g., the temporary phone number described above). The access server 320 may then relay (319) the response to the user device 310. Alternatively, the access server 310 may generate a new response based upon the response from the authentication entity 344 and transmit (319) the new response to the user device 310. Upon receiving the response, the user device 310 may update its configuration to route communications over the preferred communication network 340.

Figure 3A:
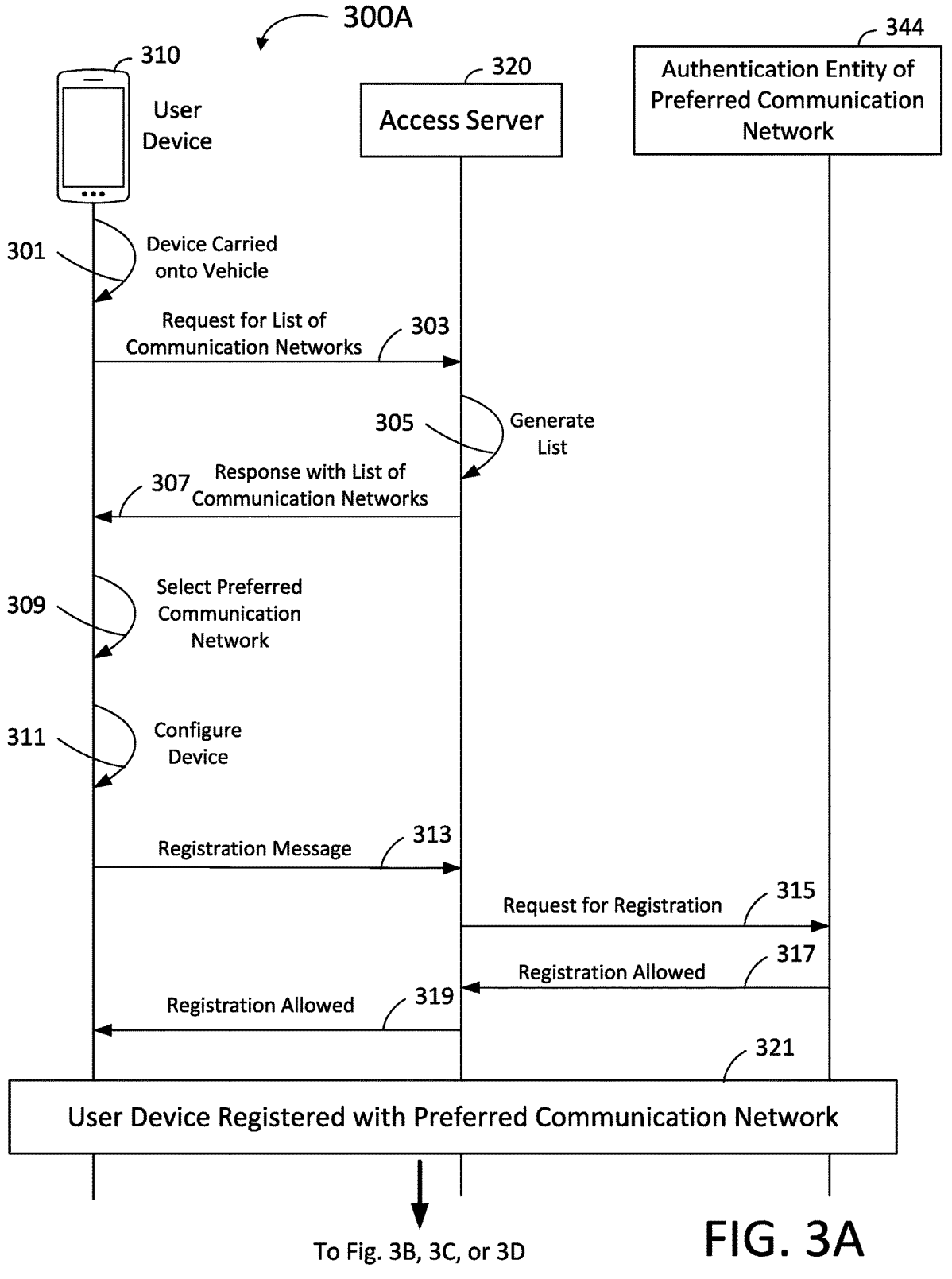
FIGS. 3A-3D are example signal diagrams that illustrate how the method for configuring a user device to access a communication network disclosed herein may be performed.
Figure 3B:
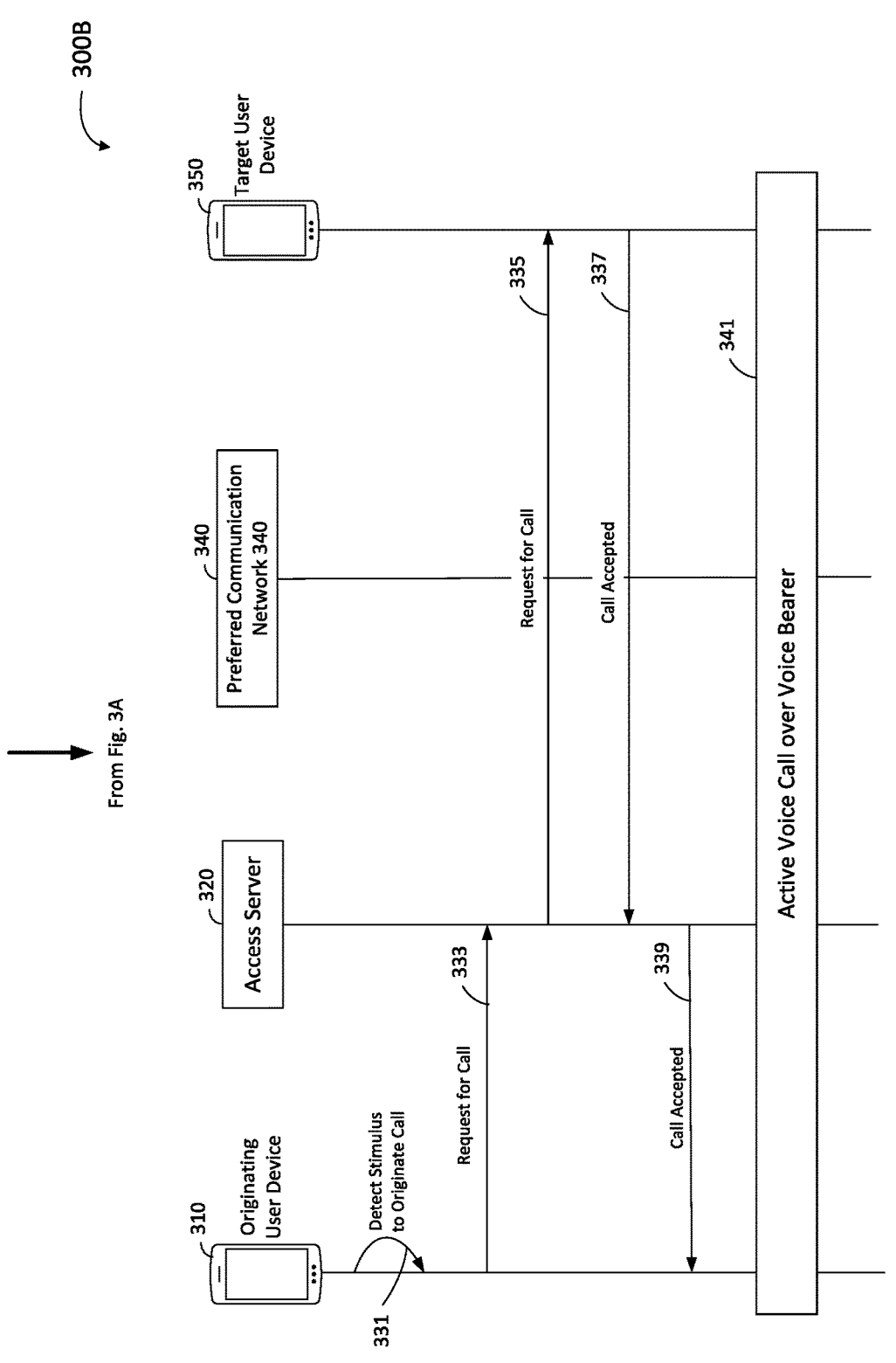

Continuing the signal diagram onto FIG. 3B, depicted is a signal diagram 300B in which the user device 310 originates a call to a target user device 350. The signal diagram may begin when a user (the "originating user") of the originating user device 310 interacts with the application to originate a voice call to a user (the "terminal user") outside of the vehicle. Accordingly, the originating user device 310 may detect (331) a stimulus to originate a call via the application. In the illustrated embodiment, the application may cause the originating user device 310 to transmit (333) to the access server 320 a request for a voice call with an identifier of a target user device 350 associated with the target user. The access server 320 may then transmit (335) a request for a voice call with the target user device 350 via the preferred communication network 340. In this embodiment, the request may include an indication of the preferred communication network (e.g., a network address or domain associated with the preferred communication network). Accordingly, the access server 320 may act as a relay between the originating user device 310 and the preferred communication network 340. In other embodiments, the application may cause the originating user device 310 to transmit (333) the request for the voice call directly to equipment aboard the vehicle associated with preferred communication network 340 without utilizing the access sever 320 as a relay. In either scenario, the equipment aboard the vehicle associated with the preferred communication network may establish a voice bearer on the preferred communication network for communicating with the target device 350.

Upon a user of the target user device 350 accepting the call, the target user device may transmit (337) a response via the preferred network 340 indicating the call has been accepted. In this process, the access server 320 may or may not act as a relay as described with respect to transmitting the request for a voice call above. Upon receiving the response with acceptance, the originating user device 310 and terminal user device 350 may be coupled via an active voice call 341.

Figure 3C:
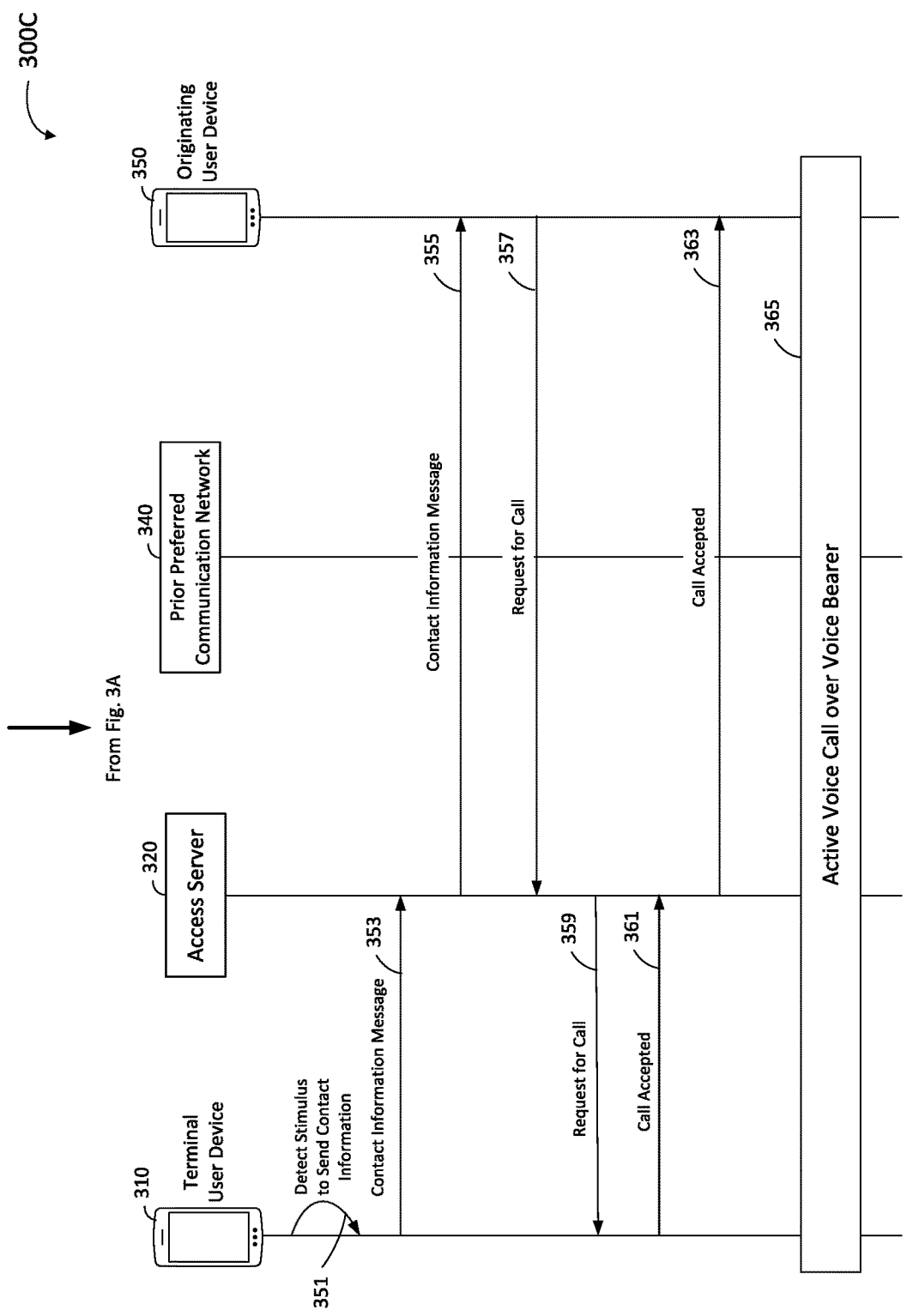

Continuing the signal diagram onto FIG. 3C, illustrated is a signal diagram 300C for terminating a call at the user device 310. The signal diagram 300C may begin when a user in the vehicle (the "terminal user") interacts with the application to send contact information to another user outside of the vehicle (the "originating user"). The terminal user device 310 may detect (351), via the application, a stimulus for sending contact information to the terminal user. In the illustrated embodiment, the terminal user device 310 may transmit (353), via the application, to the access server 320 a contact information message including the contact information associated with the terminal user device. The access server 320 may transmit (355) the contact information message to the originating user device 350 associated with the target user via the preferred communication network 340. Accordingly, the access server 320 may act as a relay between the originating user device 310 and the preferred communication network 340. In other embodiments, the application may cause the originating user device 310 to transmit (353) the contact information message directly to equipment aboard the vehicle associated with preferred communication network 340 without utilizing the access sever 320 as a relay. Upon receiving the contact information message, the target user may initiate a voice call with the originating user using the contact information included in the contact information message.

In one embodiment, the contact information message may include a temporary number (e.g., a temporary phone number, or an access server identifier and a user device extension as described above) assigned to the terminal user device 310. The originating user may call the temporary number such that the target user device 350 may transmit (357) a request for a voice call to the terminal user device 310 via the preferred communication network 340. In another embodiment, the contact information message may include a link for a voice call. The originating user may click or otherwise interact with the link to initiate a voice call such that the originating user device 350 may transmit (357) a request for a voice call to the terminal user device 310 via the preferred communication network 340. The access server 320 may or may not be a relay in this process as described above with respect to transmitting the contact information message.

When the terminal user accepts the voice call, e.g., by picking up the phone, the terminal user device 310 may transmit (361) a response to the originating device 350 indicating that the request for voice call has been accepted. The access server 320 may or may not be a relay in this process as described above with respect to transmitting the contact information message or transmitting a request for a voice call. Upon the originating user device 350 receiving the response indicating the acceptance, the terminal user device 310 and originating user device 350 may be coupled via an active voice call 365.

In one embodiment, the terminal user device 310 may register with a new communication network after transmitting a contact information message via the prior communication network, as will be described below. In this embodiment, after the terminal user device 310 registers with the new communication network, the terminal user device 310 may transmit a new contact information message via the new communication network. The new contact information may be different from the prior contact information. The originating user device 350 may then call the terminal user device 310 using the new contact information via the new communication network.

Figure 3D:
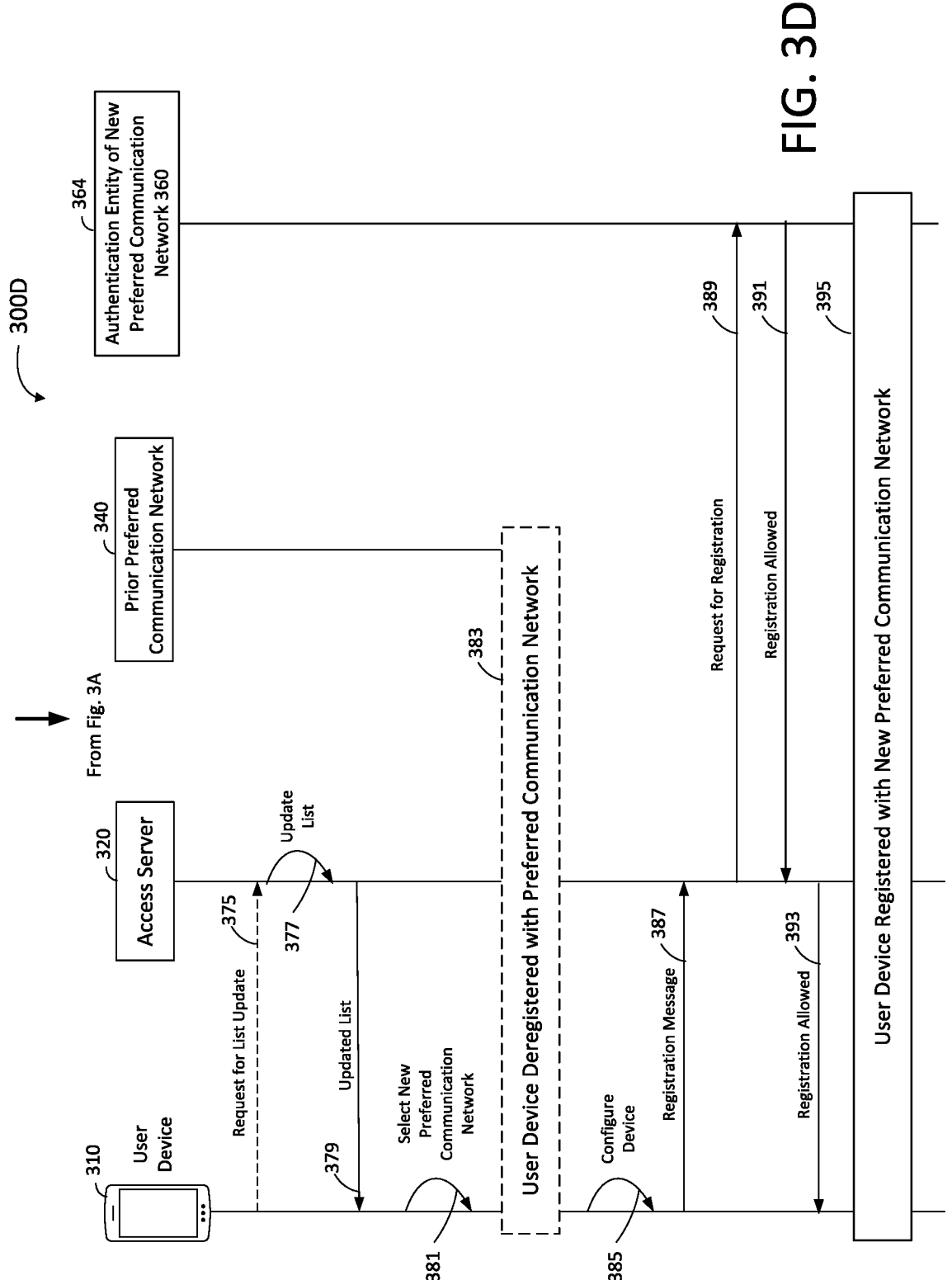

Continuing the signal diagram onto FIG. 3D, illustrated is a signal diagram 300d where the set of available communication networks has changed causing the user device 310 to re-evaluate its preferred communication network. In one embodiment, the application may cause the user device 310 to periodically transmit (375) a request for updating the list of communication networks to the access server 320. In response, the access server 320 may update (377) the list of communication networks based upon a current state of the vehicle in accordance with the techniques described elsewhere herein. The access server 320 may then transmit (379) a response with the updated list to the user device 310.

In another embodiment, the access server 320 may evaluate whether the list of available communication networks is to be updated. The access server 320 may perform this evaluation automatically and/or periodically. For example, the access server 320 may evaluate whether there is a substantial change of the list of available networks. A substantial change may be that at least one communication network becomes available or unavailable with respective to the previous list, and/or at least a change in one characteristic of at least one communication network beyond a predetermined threshold. If the access server 320 updates the list, the access server 320 may transmit (379) the updated list to the user device 310.

Upon receiving the updated list, the application may cause the user device 310 to select (381) a new preferred communication network 360. If the new preferred communication network 360 is different from the prior preferred communication network 340, the user device 310 may deregister (383) with the prior preferred communication network 340 and configure (385) itself to access the new preferred communication network 360 in a similar manner as described above regarding step 311. The user device 310 may then register with the new preferred communication network 360 in a similar manner as described above regarding steps 313-319.

Figure 4A:
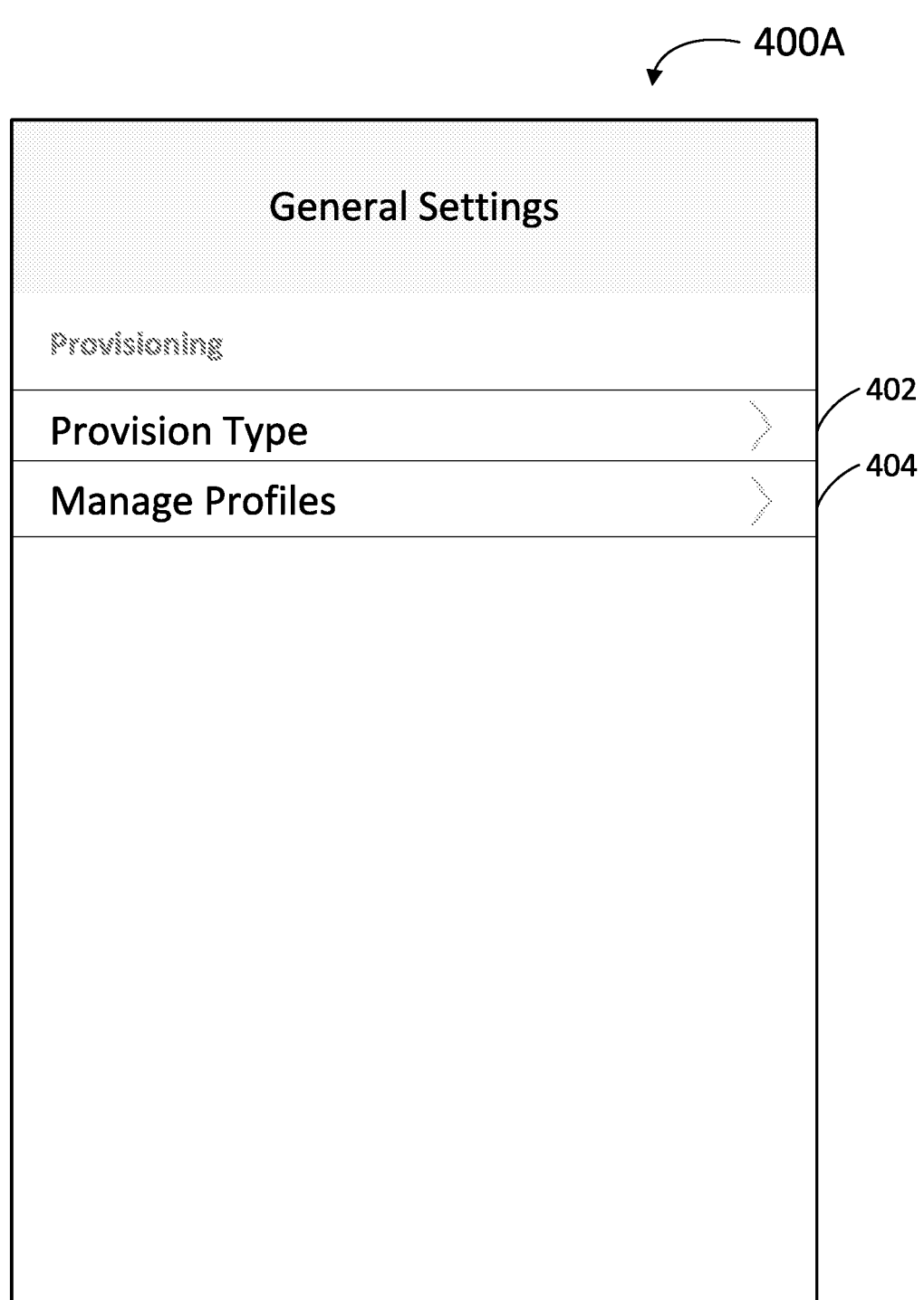

FIG. 4A depicts an exemplary interface 400A that may by displayed when an application (such as application 114) is executed on a user device (such as user device 110 or 310). As depicted, the interface 400A may allow the user to configure settings with respect to accessing a communication network. The selectable icon "Provision Type" 402 may allow the user device to automatically access a preferred communication network or limit the access with a particular communication network as will be described below. The selectable icon "Manage Profiles" 404 may allow the user to input or edit profiles used to access the communication networks as will be described below.

Figure 4B:
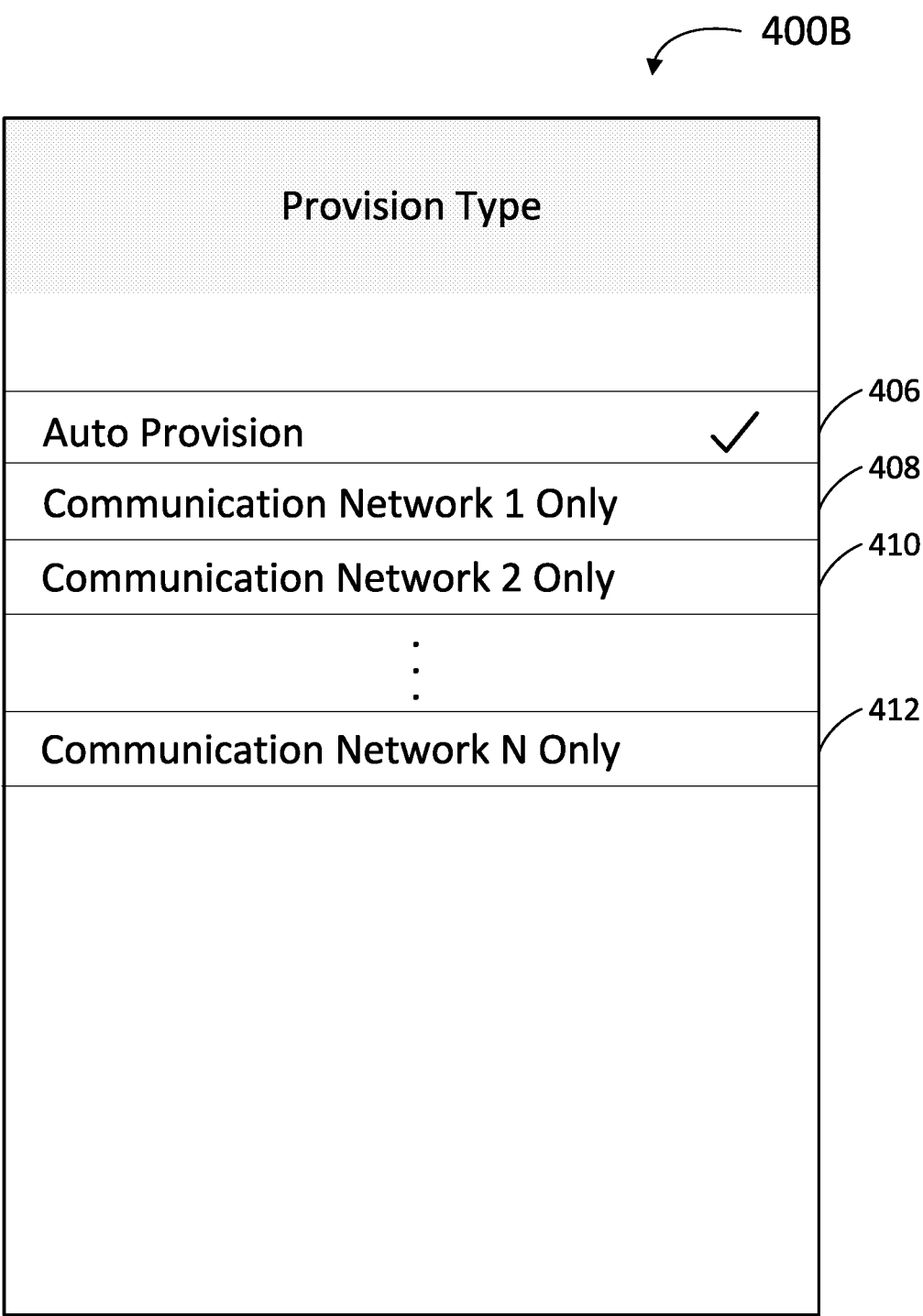

Turning to FIG. 4B, the exemplary interface 400B may be displayed when the user selects or otherwise interacts with the selectable icon "Provision Type" 402 in FIG. 4A. If the user selects "Auto Provision" 406, the user device may automatically select a communication network as described above with respect to step 309 in FIG. 3A or step 381 in FIG. 3D. Alternatively, the user may choose any of the communication networks 408-412 associated with predefined profiles maintained by the application. In this scenario, the user device may access to the selected communication network only. Steps 303-309 in FIG. 3A may be omitted in this scenario.

Figure 4C:
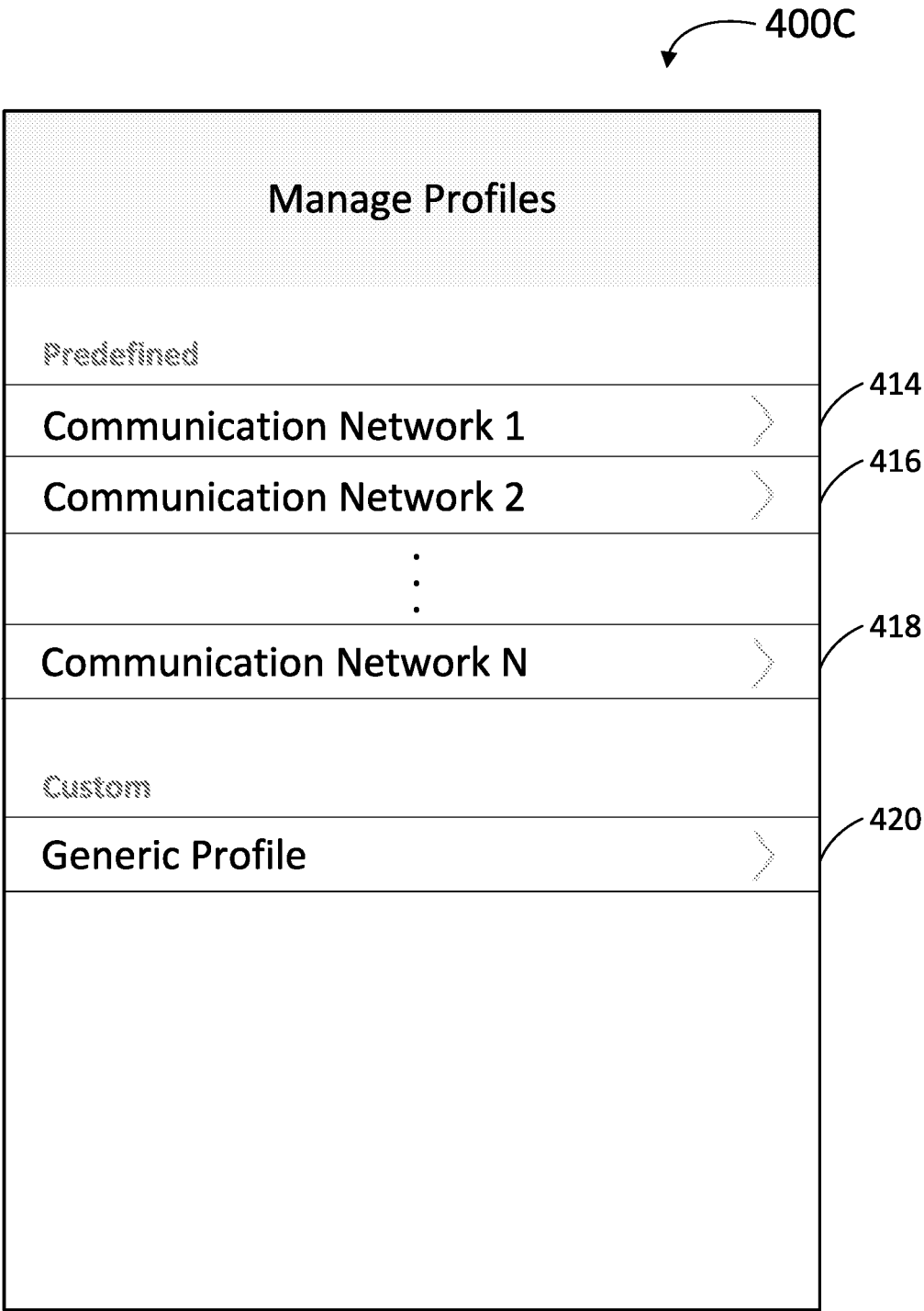

Turning to FIG. 4C, the exemplary interface 400C may be displayed when the user clicks or otherwise interacts with the selectable icon "Manage Profiles" 404 in FIG. 4A. Selectable icons 414-418 may allow the user to view or edit the profiles maintained by the application in connection with the respective communication networks. Selectable icon "Generic Profile" 420 may allow the user to manually input a new profile as will be described below.

Figure 4D:
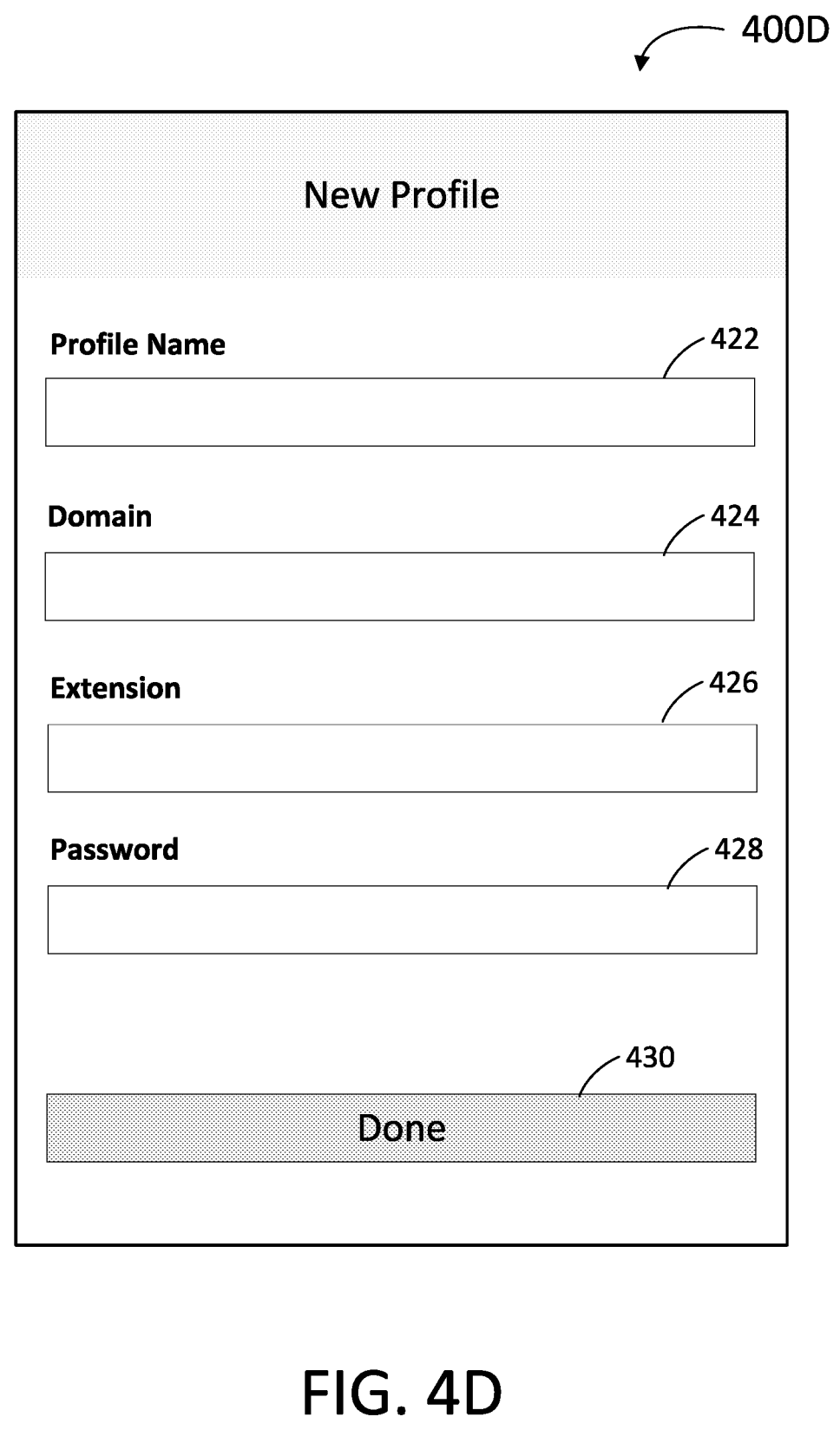

Turning to FIG. 4D, the exemplary interface 400D may be displayed when the user clicks or otherwise interacts with the selectable icon "Generic Profile" 420 in FIG. 4C. The user may input a profile name for a communication network in the "Profile Name" input box 422, which may be any text chosen by the user. The user may input a domain of the communication network in the "Domain" input box 424. The domain may be an IP address of a gateway associated with the communication network or a domain name assigned to the communication network that resolves to the IP address. The user may input an extension number as described herein for the user device in the "Extension" input box 426. The user may input a password for accessing the communication network. An access server (such as the access server 120 or 320) and/or an authentication entity of the communication network may authenticate a user account associated with the user device based upon the password. After the user inputs all necessary information in the input boxes, the use may click or otherwise interact with selectable icon "Done" 430 to save the profile in the user device via the application. The user device may then configure the user device to access the communication network using the profile in step 311 in FIG. 3A or step 385 in FIG. 3D.

Figure 5:
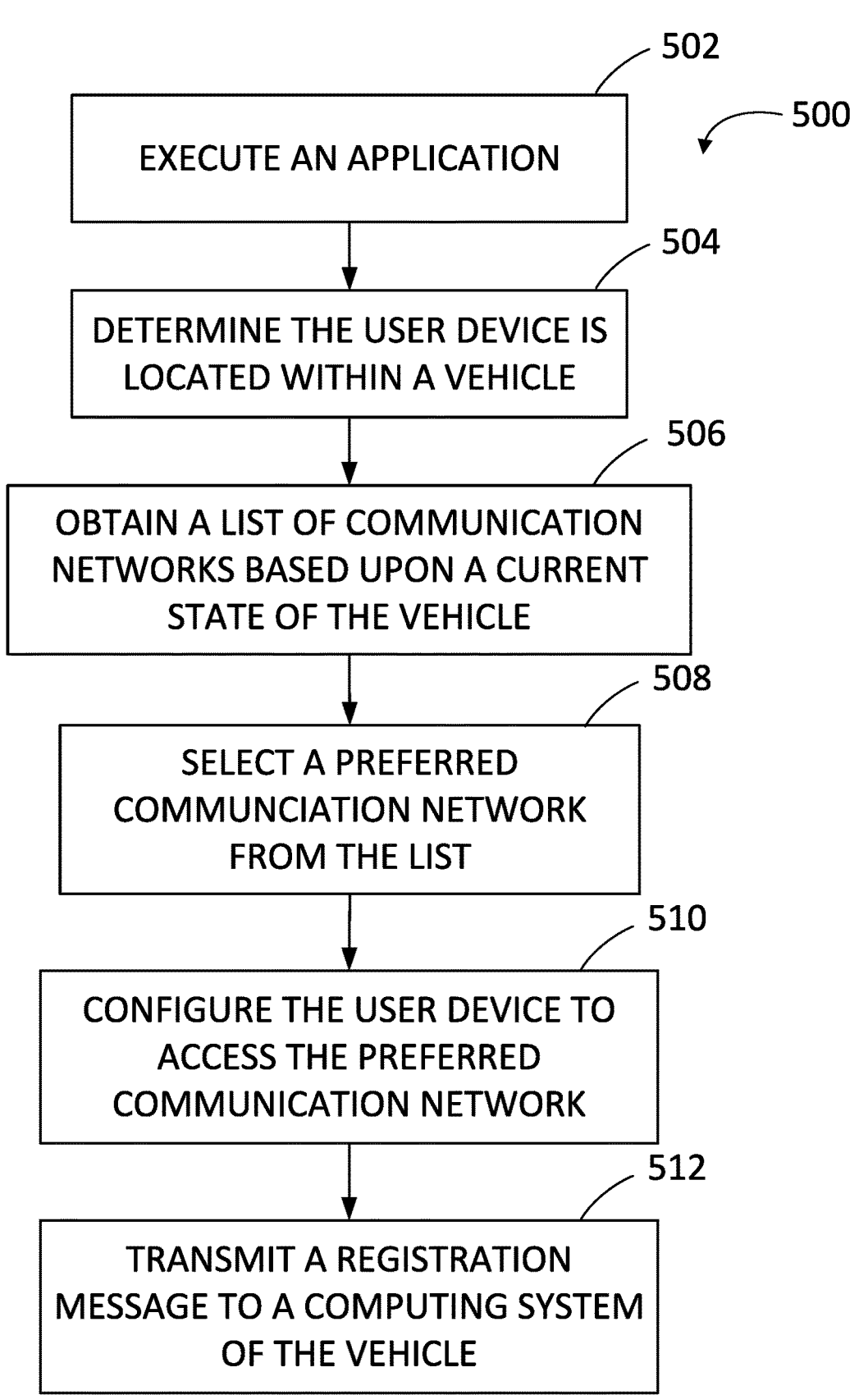
FIG. 5 is an example flow diagram of an example method for configuring a user device to access a communication network, which may be implemented in one of the user devices 110 depicted in FIG. 1.

FIG. 5 depicts an example method 500 for configuring a user device to access a communication network. The method may be performed by an electronic device (such as the user device 110 or 310) via an application disclosed herein.

The method may begin at block 502 where a user causes a user device to execute an application described herein. The application may be configured to support voice communications when the user device is located within a plurality of vehicles. At block 504, the user device may determine, via the application, whether it is within the plurality of vehicles as described with respect to step 301 in FIG. 3A. Upon determining that the user device is within a vehicle of the plurality of vehicles, at block 506, the user device may obtain, via the application and from a computing system associated with the vehicle, a list of communication networks that support voice bearers available based upon a current state of the vehicle as described with respect to steps 303-307 in FIG. 3A. At block 508, the user device may select, via the application, a preferred communication network from the list of communication networks based on one or more predetermined characteristics of the communication networks as described with respect to step 309 in FIG. 3A. At block 510, the user device may configure, via the application, the user device with credentials to access the preferred communication network as described with respect to step 311 in FIG. 3A. At block 512, the user device may transmit, to the computing system associated with the vehicle, a registration message that includes the credentials for the preferred communication network as described with step 313 in FIG. 3A.

Figure 6A:
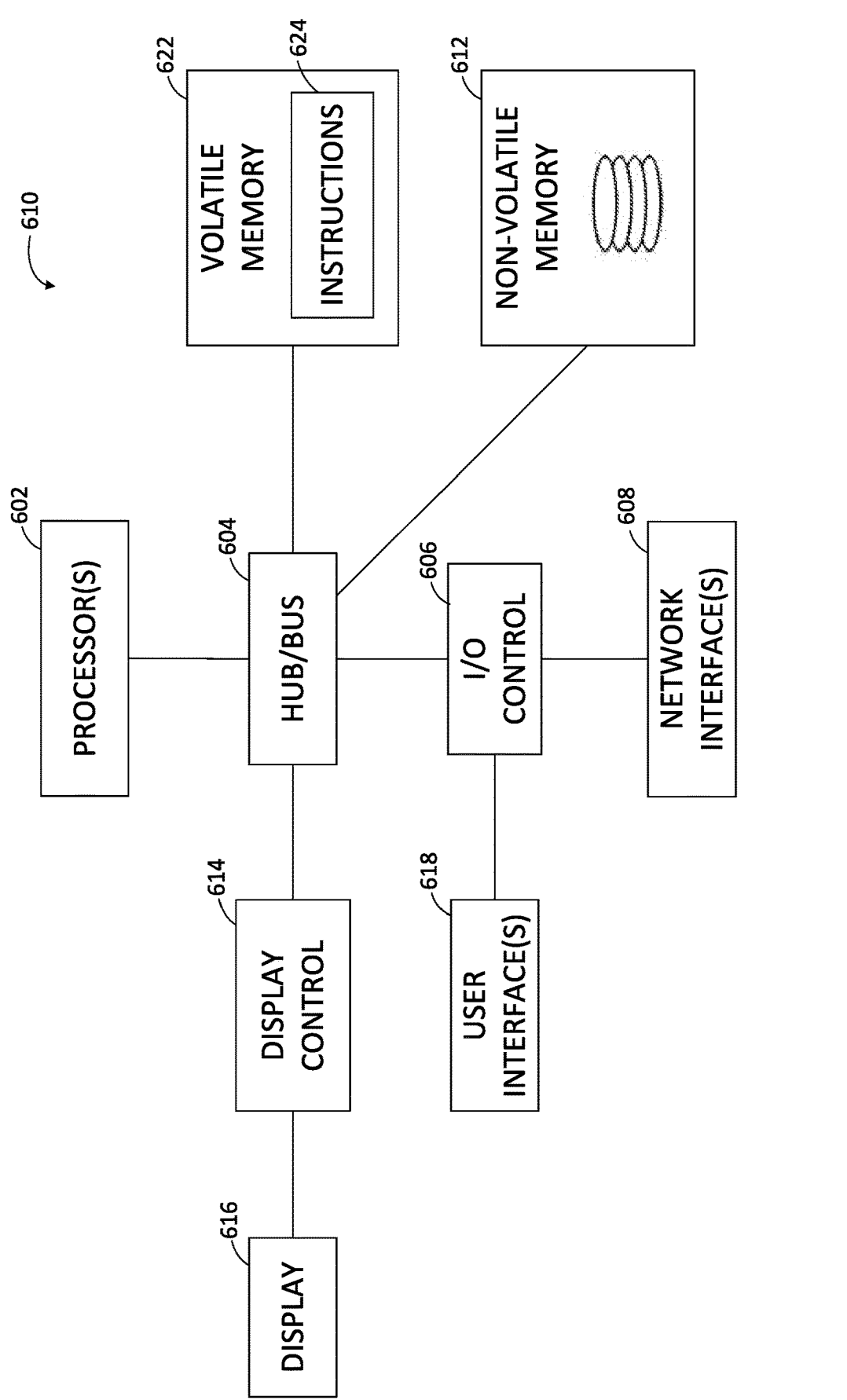
FIG. 6A is a block diagram of an example user device that may be utilized in the method for configuring the user device to access a communication network disclosed herein.

FIG. 6A illustrates a block diagram of an example user device 610 that may perform the method for configuring the user device to access a communication network as described herein.

The user device 610 may include, for example, one more central processing units (CPUs) or processors 602, and one or more buses or hubs 604 that connect the processor(s) 602 to other elements of the user device 610, such as a volatile memory 622, a non-volatile memory 612, a display controller 614, and an I/O controller 606. The volatile memory 622 and the non-volatile memory 612 may each include one or more non-transitory, tangible computer readable storage media such as random-access memory (RAM), read only memory (ROM), FLASH memory, a biological memory, a hard disk drive, a digital versatile disk (DVD) disk drive, etc.

In an embodiment, the volatile memory 622 and/or the non-volatile memory 612 may store instructions 624 that are executable by the processor 602. The instructions may include an application for communicate while on-board a vehicle (such as the application 110 and/or other similar applications described herein). The non-volatile memory 612 may store a database maintaining the profiles and/or characteristics of communication networks as described herein.

In an embodiment, the display controller 614 may communicate with the processor(s) 602 to cause information to be presented on a connected display 616. In an embodiment, the I/O controller 606 may communicate with the processor(s) 602 to transfer information and commands to/from the user interface 618, which may include a mouse, a keyboard or key pad, a touch pad, click wheel, lights, a speaker, a microphone, etc. In an embodiment, at least portions of the display 616 and of the user interface 618 are combined in a single, integral device, e.g., a touch screen. Additionally, data or information may be transferred to and from the user device 610 via a network interface 608. In some embodiments, the user device 610 may include more than one network interface 608, such as a wireless interface and a wired interface.

The illustrated user device 610 is only one example of a user device suitable to perform the method for configuring the user device to access a communication network. Other embodiments of the user device 610 may also be used to perform the method, even if the other embodiments have more or fewer components than shown in FIG. 6A, have one or more combined components, or have a different configuration or arrangement of the components. Moreover, the various components shown in FIG. 6A can be implemented in hardware, a processor executing software instructions, or a combination of both hardware and a processor executing software instructions, including one or more signal processing and/or application specific integrated circuits.

Figure 6B:
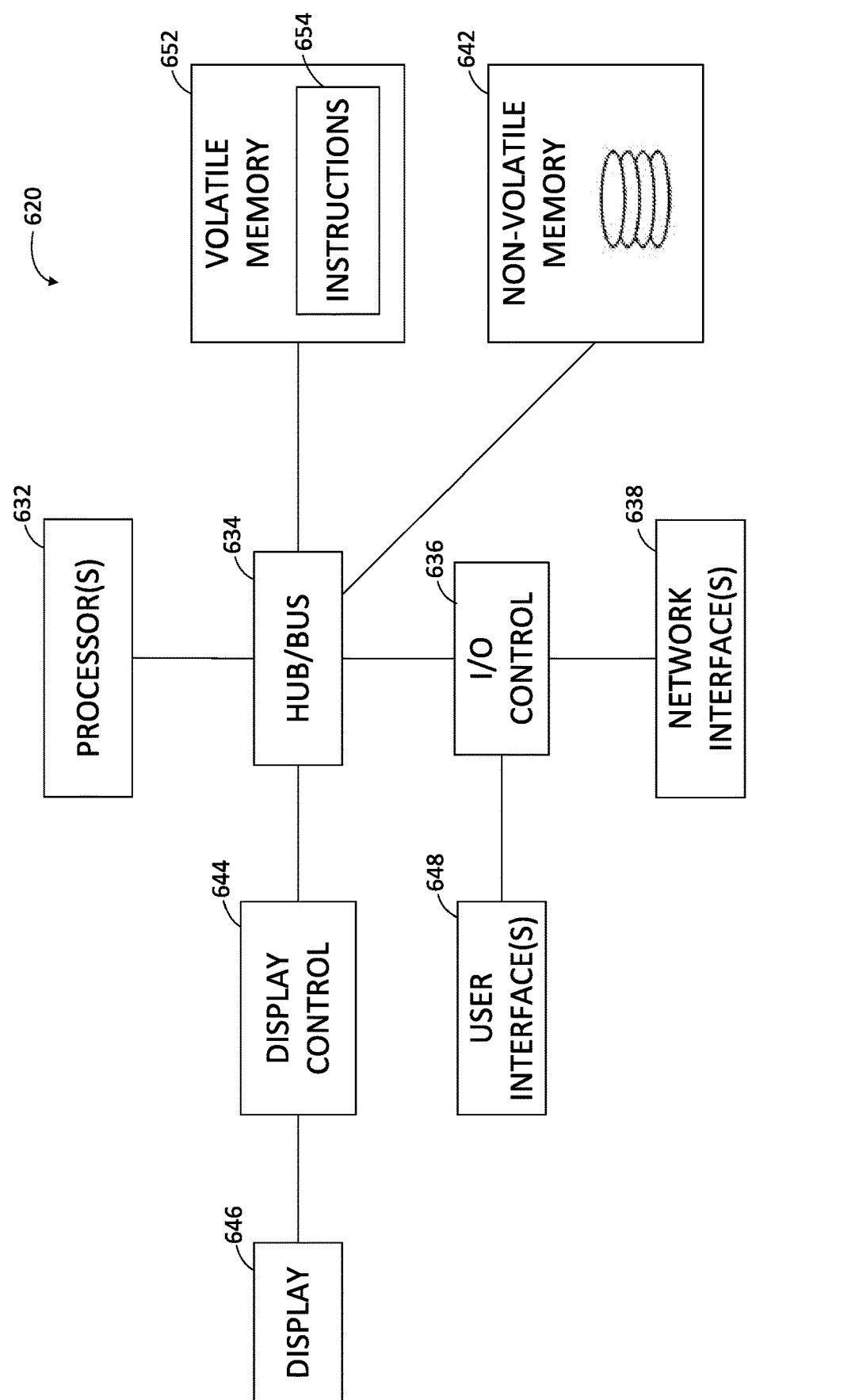
FIG. 6B is a block diagram of an example access server that may be utilized in the method for configuring the user device to access a communication network disclosed herein.

FIG. 6B illustrates a block diagram of an example access server 620 that may perform the method for configuring a user device to access a communication network as described herein.

The access server 620 may include, for example, one more central processing units (CPUs) or processors 632, and one or more buses or hubs 634 that connect the processor(s) 632 to other elements of the access server 620, such as a volatile memory 652, a non-volatile memory 642, a display controller 644, and an I/O controller 636. The volatile memory 652 and the non-volatile memory 642 may each include one or more non-transitory, tangible computer readable storage media such as random-access memory (RAM), read only memory (ROM), FLASH memory, a biological memory, a hard disk drive, a digital versatile disk (DVD) disk drive, etc.

In an embodiment, the volatile memory 652 and/or the non-volatile memory 642 may store instructions 654 that are executable by the processor 632. The non-volatile memory 642 may store a routing table including a correspondence between a phone number (e.g., a temporary phone number or an identifier and an extension number as described above) and a user device connected to the access server 620. Further, the non-volatile memory 642 may store a database maintaining the profiles and/or characteristics of communication networks as described herein.

In an embodiment, the display controller 644 may communicate with the processor(s) 632 to cause information to be presented on a connected display 646. In an embodiment, the I/O controller 636 may communicate with the processor (s) 632 to transfer information and commands to/from the user interface 648, which may include a mouse, a keyboard or key pad, a touch pad, click wheel, lights, a speaker, a microphone, etc. In an embodiment, at least portions of the display 646 and of the user interface 648 are combined in a single, integral device, e.g., a touch screen. Additionally, data or information may be transferred to and from the user device 640 via a network interface 638. In some embodiments, the user device 640 may include more than one network interface 638, such as a wireless interface and a wired interface.

The illustrated access server 620 is only one example of an access server suitable to perform the method for configuring a user device to access a communication network. Other embodiments of the access server 620 may also be used to perform the method, even if the other embodiments have more or fewer components than shown in FIG. 6B, have one or more combined components, or have a different configuration or arrangement of the components. Moreover, the various components shown in FIG. 6B can be implemented in hardware, a processor executing software instructions, or a combination of both hardware and a processor executing software instructions, including one or more signal processing and/or application specific integrated circuits.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspect:

1. A method, implemented by a user device, for configuring the user device to access a communicating network, comprising: executing, via one or more processors, an application configured to support voice communications when the user device is located within a plurality of vehicles; determining, via the application, that the user device is in a vehicle of the plurality of vehicles; obtaining, via the application and from a computing system associated with the vehicle, a list of communication networks that support voice bearers available based upon a current state of the vehicle; selecting, via the application, a preferred communication network from the list of communication networks based on one or more predetermined characteristics of the communication networks; configuring, via the application, the user device with credentials to access the preferred communication network; and transmitting, to the computing system associated with the vehicle, a registration message that includes the credentials for the preferred communication network.

2. The method of the previous aspect, wherein the one or more predetermined characteristics include at least one of the following a cost, a latency, and a data rate of the respective voice bearers of the communication network.

3. The method of any combination of the preceding aspects, wherein the credentials are maintained in a profile of the preferred communication network stored in the user device.

4. The method of any combination of the preceding aspects, wherein the profile includes at least one of a domain, a profile name, or an extension number associated with the communication network.

5. The method of any combination of the preceding aspects, wherein configuring the user device to access the preferred communication network further comprises: configuring, via the application, the user device to access the preferred communication network with the credentials maintained in a profile of the preferred communication network using input provided by a user of the user device.

6. The method of any combination of the preceding aspects, further comprising: detecting, via the application, a stimulus to originate a voice call with a second user device located outside the vehicle; and establishing the voice call with the second user device via a voice bearer of the preferred communication network.

7. The method of any combination of the preceding aspects, wherein the list of communication networks includes at least one of a satellite-based network or an air-to-ground network.

8. The method of any combination of the preceding aspects, further comprising: obtaining, via the application and from the computing system associated with the vehicle, an updated list of communication networks available based upon an updated state of the vehicle, and selecting, via the application, a new preferred communication network from the updated list of communication network.

9. The method of any combination of the preceding aspects, further comprising: configuring, via the application, the user device with credentials to access the new preferred communication network; and transmitting, to the computing system associated with the vehicle, a registration message that includes the credentials for the new preferred communication network.

10. The method of any combination of the preceding aspects, further comprising: disconnecting, via the application, the user device with the preferred communication network.

11. A user device, comprising: one or more processors; and a non-transitory memory storing executable instructions thereon that, when executed by the one or more processors, cause the one or more processors to: execute an application configured to support voice communications when the user device is located within a plurality of vehicles; determine, via the application, that the user device is in a vehicle of the plurality of vehicles; obtain, via the application and from a computing system associated with the vehicle, a list of communication networks that support voice bearers available based upon a current state of the vehicle; select, via the application, a preferred communication network from the list of communication networks based on one or more predetermined characteristics of the communication networks; configure, via the application, the user device with credentials to access the preferred communication network; and transmit, to the computing system associated with the vehicle, a registration message that includes the credentials for the preferred communication network.

12. The user device of any combination of the preceding aspects, wherein to configure the user device to access the preferred communication network, the executable instructions, when executed by the one or more processors, further cause the one or more processors to: configure the user device using a profile of the preferred network stored in the user device.

13. The user device of any combination of the preceding aspects, wherein to configure the user device to access the preferred communication network, the executable instructions, when executed by the one or more processors, further cause the one or more processors to: configure, via the application, a profile of the preferred network using input provided by a user of the user device.

14. The user device of any combination of the preceding aspects, wherein the executable instructions, when executed by the one or more processors, further cause the one or more processors to: detect, via the application, a stimulus to originate a voice call with a second user device located outside the vehicle; and establish the voice call with the second user device via a voice bearer of the preferred communication network.

15. The user device of any combination of the preceding aspects, wherein the list of communication networks includes at least one of satellite network and one air-to-ground network.

16. The user device of any combination of the preceding aspects, wherein the executable instructions, when executed by the one or more processors, further cause the one or more processors to: obtain, via the application and from the computing system associated with the vehicle, an updated list of communication networks available based upon an updated state of the vehicle, and select, via the application, a new preferred communication network from the updated list of communication network.

17. The user device of any combination of the preceding aspects, wherein the executable instructions, when executed by the one or more processors, further cause the one or more processors to: configure, via the application, the user device with credentials to access the new preferred communication network; and transmit, to the computing system associated with the vehicle, a registration message that includes the credentials for the new preferred communication network.

18. The user device of any combination of the preceding aspects, wherein the executable instructions, when executed by the one or more processors, further cause the one or more processors to: disconnect, via the application, the user device with the preferred communication network.

19. A computer readable storage medium storing non-transitory computer readable instructions, wherein the instructions, when executed on one or more processors of a user device, cause the one or more processors to: execute an application configured to support voice communications when the user device is located within a plurality of vehicles; determine, via the application, that the user device is in a vehicle of the plurality of vehicles; obtain, via the application and from a computing system associated with the vehicle, a list of communication networks that support voice bearers available based upon a current state of the vehicle; select, via the application, a preferred communication network from the list of communication networks based on one or more predetermined characteristics of the communication networks; configure, via the application, the user device with credentials to access the preferred communication network; and transmit, to the computing system associated with the vehicle, a registration message that includes the credentials for the preferred communication network.

20. The computer readable storage medium of any combination of the preceding aspects, wherein the instructions, when executed on one or more processors of a user device, cause the one or more processors to: configure the user device using a profile of the preferred network stored in the user device.

What is claimed is:

1. A method, comprising:
executing, via one or more processors, an application configured to support voice communications when a user device is located within a plurality of vehicles;
determining, via the application, that the user device is in a vehicle of the plurality of vehicles;
obtaining, via the application and from a computing system associated with the vehicle, a list of communication networks that support voice bearers available based upon a current state of the vehicle;
selecting, via the application, a preferred communication network from the list of communication networks based on one or more predetermined characteristics of communication networks in the list of communication networks;
configuring, via the application, the user device with credentials to access the preferred communication network; and
transmitting, to the computing system associated with the vehicle, a registration message that includes the credentials for the preferred communication network.

2. The method of claim 1, wherein the one or more predetermined characteristics include at least one of the following: a cost, a latency, and a data rate of respective voice bearers of the communication networks.

3. The method of claim 1, wherein the credentials are maintained in a profile of the preferred communication network stored in the user device.

4. The method of claim 3, wherein the profile includes at least one of a domain, a profile name, or an extension number associated with the preferred communication network.

5. The method of claim 1, wherein configuring the user device to access the preferred communication network further comprises:

configuring, via the application, the user device to access the preferred communication network with the credentials maintained in a profile of the preferred communication network that is based upon input provided by a user of the user device.

6. The method of claim 1, further comprising:

detecting, via the application, a stimulus to originate a voice call with a second user device located outside the vehicle; and establishing the voice call with the second user device via a voice bearer of the preferred communication network.

7. The method of claim 1, wherein the list of communication networks includes at least one of a satellite-based network or an air-to-ground network.

8. The method of claim 1, further comprising:

obtaining, via the application and from the computing system associated with the vehicle, an updated list of communication networks available based upon an updated state of the vehicle, and selecting, via the application, a new preferred communication network from the updated list of communication networks.

9. The method of claim 8, further comprising:

configuring, via the application, the user device with second credentials to access the new preferred communication network; and transmitting, to the computing system associated with the vehicle, a second registration message that includes the second credentials for the new preferred communication network.

10. The method of claim 8, further comprising:

disconnecting, via the application, the user device with the preferred communication network.

11. A user device, comprising:

one or more processors; and a non-transitory memory storing executable instructions thereon that, when executed by the one or more processors, cause the one or more processors to:

execute, via the one or more processors, an application configured to support voice communications when the user device is located within a plurality of vehicles;

determine that the user device is in a vehicle of the plurality of vehicles;

obtain, via the application and from a computing system associated with the vehicle, a list of communication networks that support voice bearers available based upon a current state of the vehicle;

select, via the application, a preferred communication network from the list of communication networks based on one or more predetermined characteristics of communication networks in the list of communication networks;

configure, via the application, the user device with credentials to access the preferred communication network; and transmit, to the computing system associated with the vehicle, a registration message that includes the credentials for the preferred communication network.

12. The user device of claim 11, wherein to configure the user device to access the preferred communication network, the executable instructions, when executed by the one or more processors, further cause the one or more processors to:

configure the user device using a profile of the preferred communication network stored in the user device.

13. The user device of claim 11, wherein to configure the user device to access the preferred communication network, the executable instructions, when executed by the one or more processors, further cause the one or more processors to:

configure, via the application, a profile of the preferred communication network using input provided by a user of the user device.

14. The user device of claim 11, wherein the executable instructions, when executed by the one or more processors, further cause the one or more processors to:

detect, via the application, a stimulus to originate a voice call with a second user device located outside the vehicle; and establish the voice call with the second user device via a voice bearer of the preferred communication network.

15. The user device of claim 11, wherein the list of communication networks includes at least one of a satellite-based network or an air-to-ground network.

16. The user device of claim 11, wherein the executable instructions, when executed by the one or more processors, further cause the one or more processors to:

obtain, via the application and from the computing system associated with the vehicle, an updated list of communication networks available based upon an updated state of the vehicle, and select, via the application, a new preferred communication network from the updated list of communication networks.

17. The user device of claim 16, wherein the executable instructions, when executed by the one or more processors, further cause the one or more processors to:

configure, via the application, the user device with second credentials to access the new preferred communication network; and transmit, to the computing system associated with the vehicle, a second registration message that includes the second credentials for the new preferred communication network.

18. The user device of claim 17, wherein the executable instructions, when executed by the one or more processors, further cause the one or more processors to:

disconnect, via the application, the user device with the preferred communication network.

19. A computer readable storage medium storing non-transitory computer readable instructions, wherein the instructions, when executed on one or more processors of a user device, cause the one or more processors to:

execute an application configured to support voice communications when the user device is located within a plurality of vehicles;

determine, via the application, that the user device is in a vehicle of the plurality of vehicles;

obtain, via the application and from a computing system associated with the vehicle, a list of communication networks that support voice bearers available based upon a current state of the vehicle;

select, via the application, a preferred communication network from the list of communication networks based on one or more predetermined characteristics of communication networks in the list of communication networks;

configure, via the application, the user device with credentials to access the preferred communication network; and transmit, to the computing system associated with the vehicle, a registration message that includes the credentials for the preferred communication network.

20. The computer readable storage medium of claim 19, wherein the instructions, when executed on the one or more processors of the user device, cause the one or more processors to:

configure the user device using a profile of the preferred communication network stored in the user device.

* * * * *